(12) United States Patent
Bhatnagar et al.

(10) Patent No.: US 8,742,062 B2
(45) Date of Patent: Jun. 3, 2014

(54) POLYPHENYL SULFONE KETONE COPOLYMERS

(75) Inventors: Atul Bhatnagar, Alpharetta, GA (US); William W. Looney, Sugar Hill, GA (US); Chantal Louis, Alpharetta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 294 days.

(21) Appl. No.: 12/797,714

(22) Filed: Jun. 10, 2010

(65) Prior Publication Data

US 2010/0310804 A1 Dec. 9, 2010

Related U.S. Application Data

(63) Continuation-in-part of application No. PCT/EP2008/067700, filed on Dec. 17, 2008.

(60) Provisional application No. 61/014,485, filed on Dec. 18, 2007.

(51) Int. Cl.
*C08G 75/20* (2006.01)
*C08G 75/00* (2006.01)

(52) U.S. Cl.
USPC .......... 528/391; 528/373; 528/378; 528/220; 528/397; 528/491

(58) Field of Classification Search
USPC .................. 528/391, 373, 378, 220, 397, 491
See application file for complete search history.

(56) References Cited

U.S. PATENT DOCUMENTS

| | | | |
|---|---|---|---|
| 4,176,222 A | 11/1979 | Cinderey et al. |
| 4,268,635 A | 5/1981 | Hoy et al. |
| 4,320,224 A | 3/1982 | Rose et al. |
| 4,339,568 A | 7/1982 | Maresca |
| 4,804,724 A | 2/1989 | Harris et al. |
| 5,013,816 A | 5/1991 | Bobbink et al. |
| 5,116,933 A | 5/1992 | Newton |
| 2007/0037928 A1 | 2/2007 | Weinberg |

FOREIGN PATENT DOCUMENTS

| | | |
|---|---|---|
| DE | 19513403 A1 | 10/1996 |
| JP | 03285916 A | 12/1991 |
| JP | 20060028414 A | 2/2006 |
| WO | WO 0020789 A1 | 4/2000 |
| WO | WO 2004096418 A1 | 11/2004 |
| WO | WO 2006037755 A1 | 4/2006 |
| WO | WO 2006094988 A2 | 9/2006 |
| WO | WO 2007071780 A1 | 6/2007 |

OTHER PUBLICATIONS

Wu S.D. et al., "Synthesis and characterization of poly(aryl ether ketone sulfone) copolymers", Polymer Preprints, 1985, V. 26(2), p. 277-280; 4 pgs.
Wu S.D. et al., "Synthesis and characterization of poly(aryl ether ketone sulfone) copolymers", 31st International SAMPE Symposium, Apr. 7-10, 1986, p. 933-944; 12 pgs.

*Primary Examiner* — Duc Truong
(74) *Attorney, Agent, or Firm* — Oblon, Spivak, McClelland, Maier & Neustadt, L.L.P.

(57) ABSTRACT

A polymer comprising sulfone groups, ketone groups and optionally substituted polyarylene groups, wherein the number of moles of sulfone groups over the number of moles of ketone groups ratio is greater than 1. A process for making such polymer, a composition comprising such polymer, and articles made therefrom.

21 Claims, 4 Drawing Sheets

POLYPHENYL SULFONE KETONE COPOLYMERS

REFERENCE TO RELATED APPLICATIONS

This application is a continuation-in-part application of International Application No. PCT/EP2008/067700 filed on Dec. 17, 2008, which claims priority to U.S. provisional application No. 61/014,485 filed on Dec. 18, 2007, the whole content of each of these applications being incorporated herein by reference for all purposes.

FIELD OF THE INVENTION

The present invention relates to a particular class of polymers comprising sulfone groups, ketone groups and optionally substituted polyarylene groups, featuring excellent properties which make them ideal candidates for medical, plumbing or aerospace applications.

BACKGROUND OF THE INVENTION

Aromatic sulfone polymers (such as polyphenylsulfone (PPSU), polyethersulfone (PESU) and bisphenol A polysulfone (PSU)) have been widely used in applications where their outstanding properties have been valued. These properties include dimensional stability, low coefficient of thermal expansion, retention of modulus at high temperature, radiation resistance, hydrolytic stability and tough mechanical properties. Such applications include articles as various as plumbing, commercial aircraft interiors, cookware, wire insulation and food service articles. For instance, polyphenylsulfone (PPSU) is a commonly used polymer in applications such as plumbing, medical and aerospace applications.

However, despite outstanding resistance to hydrolysis these polymers are also subjected to specific chemical environments which can cause environmental stress cracking due to either long or short term exposure to various chemicals. These chemical environments include for example aggressive surfactants or polyurethane curing agents for the plumbing applications, cleaning and sterilization reagents for the medical materials applications. Moreover, these later are facing more and more stringent cleaning and sterilization requirements.

There is thus a need in the art to provide new polymers featuring all the superior properties of aromatic sulfone polymers, such as hydrolytic stability and tough mechanical properties, while also performing outstanding chemical resistance.

Precisely, aromatic ketone polymers offer an exceptional balance of technical properties, namely high melting point, excellent thermal stability, high stiffness and strength, good toughness and really excellent chemical resistance. However, the somewhat low glass transition of these materials limits theirs use in certain specific applications where the use temperature is above 170° C. Moreover, their high costs preclude their use in many commodity markets.

Prior art documents describe various attempts to combine the most advantageous properties of aromatic ketone polymers with the ones of aromatic sulfone polymers.

WO 2007/071780 in the Applicant's name describe the use of an effective amount of a poly(biphenyl ether sulfone) for diluting a poly(aryl ether ketone) making available polymer compositions with a lower cost than that of poly(aryl ether ketone) compositions, and featuring a chemical resistance at least substantially the same as the one obtained by said poly(aryl ether ketone) compositions.

Unfortunately, those blends still suffer from poor intrinsic properties, such as opacity, due to their nature of blends. Besides, the properties of blends are typically dependent on the processing conditions that can impact their morphology while the invented polymer does not display this sensitivity.

SUMMARY OF THE INVENTION

The present invention makes now available polymers featuring significantly improved resistance to chemical agents that are commonly found in environments where the low creep and excellent hydrolytic stability of the current aromatic sulfone polymers are highly valued. These materials have many of the characteristics of amorphous materials (such as toughness, shrinkage, etc.) that allow them to be used in tooling designed and built for PPSU.

In particular, the present invention makes now available polymers featuring improved environmental stress-cracking resistance (ESCR), compared to the one of the current aromatic sulfone polymers, reducing for example consequently the potential for failure by solvent induced stress cracking in plumbing and medical applications.

In addition, the present invention makes now available polymers featuring also improved melt flow at a given melt flow ratio as compared to PPSU, which can be significant if one were to design a complex geometry mold. Thin walled parts can be fabricated easier as compared to the neat PPSU or the prior art PPSU blends.

DETAILED DESCRIPTION OF THE INVENTION

In a first aspect, the present invention concerns thus a polymer comprising:
sulfone groups;
ketone groups;
polyarylene groups which are optionally substituted;
wherein the number of moles of sulfone groups over the number of moles of ketone groups ratio is greater than 1.

This number of moles of sulfone groups over the number of moles of ketone groups ratio is preferably greater than 1.25, more preferably greater than 1.4, still more preferably greater than 1.6 and most preferably greater than 2.

The term "sulfone groups" is intended to denote groups containing a sulfonyl functional group ($-S(=O)_2-$) attached to two carbon atoms where the central sulfur atom is twice double bonded to oxygen.

The term "ketone groups" is intended to denote groups containing a carbonyl functional group ($-C(=O)-$) attached to two carbon atoms where the central carbon atom is double bonded to oxygen.

The term "polyarylene groups" is intended to denote groups containing multiple benzenic ring structures, each benzenic ring being joined directly by at least one single bond to at least one other benzenic ring.

Non limitative examples of such polyarylene groups include:
- polyarylene groups with fused benzenic rings such as naphthylenes (and in particular 2,6-naphthylene), anthrylenes (and in particular 2,6-anthrylene) and phenanthrylenes (and in particular 2,7-phenanthrylene), naphthacenylenes and pyrenylenes groups;
- polyarylene groups with directly joined benzenic rings such as biphenylene groups (p-biphenylene, triphenylene groups such as p-triphenylene and tetraphenylene groups such as p-tetraphenylene).
- polyarylene groups with fused and directly joined benzenic rings such as binaphthylenes.

The polyarylene groups are also optionally substituted. Such substituted polyarylene groups comprise an atom or group of atoms (i.e. a substituent) substituted in place of a hydrogen atom on one or more of their benzenic ring(s).

As polyarylene groups, biphenylene groups are generally preferred.

The ketone groups of the polymer according to the present invention usually originate from ketone containing monomers. Non limitative examples of such ketone containing monomers include:

(1)

(2)

(3)

(4)

(5)

(6)

(7)

where X is a halogen, a nitro, a hydroxyl or a thiol group, and where Y is an alkyl, an aryl, a ketone, an —O—, or a —S— group.

The sulfone groups of the polymer according to the present invention usually originate from sulfone containing monomers. Non limitative examples of such sulfone containing monomers include:

(8)

(9)

(10)

(11)

(12)

(13)

(14)

where X is a halogen, a nitro, a hydroxyl or a thiol group, and where Y is an alkyl, an aryl, a ketone, an —O—, or a —S— group.

The polymer according to the present invention is advantageously exclusively made of the above described monomers. Nevertheless, the polymer according to the present invention may contain other monomers. Non limiting examples of such monomers are:

(15)

(16)

(17)

(18)

where X is a halogen, a nitro, a hydroxyl or a thiol group, Ra are independently hydrogen, chlorine, bromine or a $C_{1-30}$ monovalent hydrocarbon or hydrocarbonoxy group, each Rb is hydrogen, chlorine or bromine, subject to the provision that at least one B is chlorine or bromine and independently Rc are hydrogen or a $C_{1-30}$ hydrocarbon group, wherein each Rd is independently selected from monovalent hydrocarbon radicals and halogen radicals; each Re is independently $C_{1-6}$ alkyl; each Rf is independently H or $C_{1-6}$ alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]6,6'-dio 1 (sometimes known as "SBI"). Mixtures comprising any of the foregoing monomers may also be employed.

In some embodiments of the invention the polymer may contain dihydroxy-substituted aromatic hydrocarbons monomers including 4,4'-(cyclopentylidene)diphenol; 4,4'-(3,3,5-trimethylcyclopentylidene)diphenol; 4,4'-(cyclohexylidene)diphenol; 4,4'-(3,3-dimethylcyclohexylidene)diphenol; 4,4'-(3,3,5-trimethylcyclohexylidene)diphenol; 4,4'-(methylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis (4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyepentane; 1,1-bis-(3,5-dimethylphenyl-4-hydroxyphenyl)cyclopentane; 1,1-bis-(3,54-dimethylphenyl-4-hydroxyphenyl)cyclohexane, bis-(3,5-dimethylphenyl-4-hydroxyphenyl)sulphide, 3-(4-hydroxyphenyl)-1,1,3-trimethylindan-5-ol, and 1-(4-hydroxyphenyl)-1,3,3-trimethylindan-5-ol.

In a particular embodiment the dihydroxy-substituted aromatic hydrocarbon monomers comprise bisphenol A, biphenol and hydroquinone.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_{1-32}$ alkyl optionally substituted with one or more groups selected from $C_{1-32}$ alkyl, $C_{3-15}$ cycloalkyl or aryl; and $C_{3-15}$ cycloalkyl optionally substituted with one or more groups selected from $C_{1-32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include $C_{6-15}$ aryl optionally substituted with one or more groups selected from $C_{1-32}$ alkyl, $C_{3-15}$ cycloalkyl or aryl. Some particular illustrative examples of aryl radicals comprise substituted or unsubstituted phenyl, biphenyl, toluoyl and naphthyl.

The polymer according to the present invention comprises generally:

at least one group (G1) of formula at least one group (G2) of formula at least one group (G3) of formula wherein the number of moles of (G1) over the number of moles of (G2) ratio is greater than 1.

This ratio is preferably greater than 1.25, more preferably greater than 2. On the other hand, it is preferably lower than 15 and more preferably lower than 10.

The groups (G1), (G2) and (G3) may be present in the polymer according to the present invention in its backbone or in its chain ends. They are preferably comprised in its recurring units.

The polymer according to the present invention is preferably derived from two or more distinct recurring units. More preferably, it is derived from two distinct recurring units.

Recurring Units (R1)

The polymer as above described may comprise recurring units (R1) obtainable by the reaction between at least one aromatic dihalo compound (D1-1) comprising at least one group (G1), and at least one aromatic dihydroxy compound.

Recurring units (R1) comprise at least one group (G1), but it may also comprise groups (G2) and/or (G3). It may also be free of groups (G2) and (G3). Excellent results were obtained with recurring units (R1) comprising groups (G1) and (G2) or (G3).

The aromatic dihalo compound (D1-1) comprising at least one group (G1) of recurring units (R1) is preferably a 4,4'-dihalodiphenylsulfone or 4,4'-bis[(4-chlorophenyl)sulfonyl]-1,1'-biphenyl. More preferably, it is a 4,4'-dihalodiphenylsulfone. Still more preferably the 4,4'-dihalodiphenylsulfone is selected from the group consisting of 4,4'-dichlorodiphenylsulfone, 4,4'-difluorodiphenylsulfone and mixtures thereof.

The aromatic dihydroxy compound of recurring units (R1) is preferably 4,4'-biphenol or 4,4'-dihydroxybenzophenone.

Recurring Units (R2)

The polymer as above described may further comprise recurring units (R2) obtainable by the reaction between at least one aromatic dihydroxy compound (D1-2) comprising at least one group (G1), and at least one aromatic dihalo compound.

Recurring units (R2) comprise at least one group (G2), but it may also comprise groups (G1) and/or (G3). It may also be free of groups (G1) and (G3). Excellent results were for example obtained with recurring units (R1) comprising both groups (G2) and (G1).

The aromatic dihydroxy compound (D1-2) comprising at least one group (G1) of recurring units (R2) is preferably dihydroxydiphenylsulfone.

Recurring Units (R3)

The polymer as above described may further comprise recurring units (R3) obtainable by the reaction between at least one aromatic dihalo compound (D2-1) comprising at least one group (G2) and at least one aromatic dihydroxy compound.

Recurring units (R3) comprise at least one group (G2), but it may also comprise groups (G1) and/or (G3). It may also be free of groups (G1) and (G3). Excellent results were for example obtained with recurring units (R3) comprising both groups (G2) and (G1).

The aromatic dihydroxy compound of recurring units (R3) is preferably 4,4'-biphenol.

The aromatic dihalo compound (D2-1) is preferably a 4,4'-dihalobenzophenone. More preferably, the 4,4'-dihalobenzophenone is selected from the group consisting of 4,4'-dichlorobenzophenone, 4,4'-difluorobenzophenone and mixtures thereof.

Recurring Units (R4)

The polymer as above described may further comprise recurring units (R4) obtainable by the reaction between at least one aromatic dihydroxy compound (D2-2), comprising at least one group (G2) and at least one aromatic dihalo compound.

Recurring units (R4) comprise at least one group (G2), but it may also comprise groups (G1) and/or (G3). It may also be free of groups (G1) and (G3). Excellent results were for example obtained with recurring units (R4) comprising both groups (G2) and (G1).

The aromatic dihydroxy compound (D2-2) of recurring units (R4) is preferably 4,4'-dihydroxybenzophenone.

Recurring Units (R5)

The polymer as above described may further comprise recurring units (R5) obtainable by the reaction between at least one aromatic dihalo compound (D3-1), comprising at least one group (G3) and at least one aromatic dihydroxy compound.

Recurring units (R5) comprise at least one group (G3), but it may also comprise groups (G1) and/or (G2). It may also be free of groups (G1) and (G2). Excellent results were for example obtained with recurring units (R5) comprising both groups (G3) and (G1).

The aromatic dihydroxy compound of recurring units (R5) is preferably 4,4'-biphenol.

Recurring Units (R6)

The polymer as above described may further comprise recurring units (R6) obtainable by the reaction between at least one aromatic dihydroxy compound (D3-2), comprising at least one group (G3) and at least one aromatic dihalo compound.

Recurring units (R6) comprise at least one group (G3), but it may also comprise groups (G1) and/or (G2). It may also be free of groups (G1) and (G2). Excellent results were for example obtained with recurring units (R6) comprising both groups (G3) and (G1).

The aromatic dihydroxy compound (D3-2) of recurring units (R6) is preferably 4,4'-biphenol.

The polymer of the present invention has a number average molecular weight of advantageously at least 500, preferably at least 5,000 and more preferably at least 10,000. In addition, the polymer of the present invention has a number average molecular weight of advantageously at most 40,000, preferably at most 35,000, and more preferably at most 30,000.

In a particular embodiment, the polymer according to the present invention is preferably free of hydroquinone groups.

Recurring units (R1), (R2), (R3), (R4), (R5) and (R6) may be the same or different. For example, a recurring unit comprising both groups (G1) and (G2) falls under both definitions of recurring units (R1) and (R4).

Non limitative examples of such recurring units as above described are listed below:

Recurring unit (i) is an example of recurring units that is at the same time recurring units (R1) and (R6). Recurring unit (ii) to (v) are respectively at the same time recurring units (R2) and (R3), (R1) and (R2), (R1) and (R4), and finally (R1) and (R6).

Excellent results were obtained with polymers comprising both recurring units (R1) and (R3).

The total weight of recurring units (R1), (R2), (R3), (R4), (R5) and (R6) over the total weight of the polymer ratio is advantageously above 0.5. This ratio is preferably above 0.7, more preferably above 0.9 and still more preferably above 0.95. Most preferably, the polymer according to the present invention comprises no other recurring unit than recurring units (R1), (R2), (R3), (R4), (R5) and (R6).

The polymer according to the present invention comprises advantageously more than 100 g of groups (G1) per kg of polymer. Preferably, it comprises more than 200 g, more preferably, more than 300 g of groups (G1) and most preferably more than 350 g of groups (G1) per kg of polymer.

The polymer according to the present invention comprises advantageously more than 25 g of groups (G2) per kg of polymer. Preferably, it comprises more than 50 g, more preferably, more than 75 g of groups (G2) and most preferably more than 100 g of groups (G2) per kg of polymer.

The polymer according to the present invention comprises advantageously more than 100 g of groups (G3) per kg of polymer. Preferably, it comprises more than 200 g, more preferably, more than 250 g of groups (G3) and most preferably more than 300 g of groups (G3) per kg of polymer.

Excellent results were obtained with the polymers featuring the following structures:

polyamideimide or any polymer featuring sufficient thermal stability to withstand processing temperature greater then 350° C. It can also be non polymeric ingredients such as a solvent, filler or additive, notably such as glass, mineral, carbon fiber, silicone oils, colorants and pigments, reinforcing agents, lubricating agents, heat stabilizers, processing aids, anti-static agents, extenders, organic and/or inorganic pigments like $TiO_2$, carbon black, acid scavengers, such as MgO, stabilizers, i.e., metal oxides and sulfides such as zinc oxide and zinc sulfide, antioxidants, flame retardants, smoke-suppressing agents, and particulate fillers and nucleating agents such as talc, mica, titanium dioxide, kaolin and the like.

The polymer composition comprises advantageously more than 1 wt. %, preferably more than 10 wt. %, still more preferably more than 50 wt. %, and the most preferably more than 90 wt. %, related to the total weight of the composition, of the polymer as above described.

The weight of said optional ingredients, based on the total weight of the polymer composition, ranges generally from 0 to 30%, preferably from 0 to 20%, more preferably from 0 to 10%, still more preferably from 0 to 5%. The polymer composition may also be substantially free of said optional ingredients.

In a further aspect, the present invention concerns a process for synthesizing the polymer as above described, which comprises the steps of:

adding at least one difunctional compound comprising a sulfone group, at least one difunctional compound comprising a ketone group, at least one difunctional coma and c representing between 65 to 90 mol. %, b and d representing between 10 to 35 mol. % of the whole polymer.

In a further aspect, the present invention concerns a composition comprising the above described copolymer, and at least one optional ingredient. Said optional ingredient can notably be a polymer of the same type or another polymer such as a polysulfone, polyphenylsulfone, polyetherimide, pound comprising an optionally substituted polyarylene group and at least one alkali metal carbonate and/or bicarbonate to a reaction medium, wherein the total number of mole of the difunctional compound comprising a sulfone group over the total number of mole of the difunctional compound comprising a ketone group ratio is greater than 1;

reacting together said difunctional compound comprising a sulfone group, said difunctional compound comprising a ketone group, and said difunctional compound comprising an optionally substituted polyarylene groups in order to obtain a polymer;

stopping said reaction as soon as the so-obtained polymer reaches the desired molecular weight;

recovering the polymer having reached the desired molecular weight.

The process according to the present invention may be advantageously carried out in the presence of a solvent. It is in fact preferably carried out in the presence of a polar aprotic solvent. Good results were obtained with a solvent selected from the group consisting of diphenyl sulfone, dimethyl acetamide, dimethyl sulphoxide, sulfolane, N-methylpyrrolydone, diphenyl sulfone, dimethyl sulfone and mixtures thereof. Excellent results were obtained with diphenyl sulfone.

In the process according to the present invention, the difunctional compound comprising a sulfone group comprises preferably a group (G1), the difunctional compound comprising a ketone group comprises preferably a group (G2), and the difunctional compound comprising an optionally substituted polyarylene group comprises preferably a group (G3).

In the process according to the present invention, the total number of mole of the difunctional compound comprising a group (G1) over the total number of mole of the difunctional compound comprising a group (G2) ratio is preferably greater than 1.25, more preferably greater than 2. On the other hand, this ratio is preferably lower than 15 and more preferably lower than 10.

In the process according to the present invention, the reaction medium is preferably heated in order to react together said difunctional compound comprising a group (G1), said difunctional compound comprising a group (G2), and said difunctional compound comprising a group (G3) in order to obtain a polymer. The reaction medium is preferably heated at a temperature of above 200° C., more preferably of above 225° C. and still more preferably of above 250° C. On the other hand, the reaction medium is preferably heated at a temperature of below 350° C. more preferably of below 325° C. and still more preferably of below 300° C. Good results were obtained when the reaction medium temperature was raised to 275° C.

The process according to the present invention is preferably carried out under a positive flow of inert gas such as nitrogen. Besides, it is also preferably carried out under anhydrous conditions.

In the process according to the present invention, the polymerization is stopped by cooling the reaction medium as soon as the obtained polymer reaches the desired molecular weight. The reaction medium is preferably cooled at room temperature.

The process according to the present invention may also further comprise the end-capping of the obtained polymer. The polymer may be end capped by the addition of excess of a dihalocompound, preferably a dihalocompound such as dichlorodiphenylsulfone. However it can also be end capped using a mono functional alkyl chloride such as methyl chloride.

In the process according to the present invention, the alkali metal carbonate and/or bicarbonate is preferably selected from the group consisting of sodium, potassium carbonate and/or bicarbonate and mixtures thereof. Sodium or mixtures of sodium and potassium carbonate and/or bicarbonate are more preferred. Mixtures of sodium and potassium carbonate and/or bicarbonate are still more preferred. Excellent results were obtained when a mixture of sodium and potassium carbonate, in a ratio of 1:9 was used. The total number of mole of the alkali metal carbonate and/or bicarbonate over the total aromatic diol compound ratio ranges preferably from 1.001 to 1.20, more preferably from 1.005 to 1.15, still more preferably from 1.008 to 1.12 and most preferably from 1.01 to 1.10. The alkali metal carbonate or bicarbonate is preferably anhydrous. Therefore, it is preferably used after a preliminary drying step.

One generally prefers to avoid the depolymerization of the obtained polymer. Therefore, the process according to the present invention may also comprise, when an aromatic difluoro compound is used, the additional step of adding a salt (S) after having stopped the reaction as soon as the so-obtained polymer reaches the desired molecular weight. The salt (S) is preferably chosen from lithium, calcium and magnesium halide or mixtures thereof. It is more preferably chosen from lithium, calcium and magnesium chloride, or mixtures thereof, and most preferably lithium chloride. The salt (S) is advantageously added in an amount ranging from 0 to 20 times the total number of moles of the aromatic difluoro compound added to the reaction medium. It ranges preferably from 2 to 18, more preferably from 4 to 16 and still more preferably from 6 to 14. Excellent results were obtained when an amount of about 8 times the total number of moles of the aromatic difluoro compound added to the reaction medium was used. The salt (S) is preferably used in an anhydrous form. Therefore, the salt (S) is preferably added after a preliminary drying step.

The invented process is very well suited for the preparation of the above described polymer.

Thanks to their excellent properties, especially their mechanical properties, the polymer and the polymer composition in accordance with the invention can be shaped in a large variety of articles or parts of articles usable in applications requiring high strength, impact strength, high temperature capability, chemical resistance, etc.

Therefore, a further aspect of the present invention concerns also an article comprising the polymer as above described or the polymer composition as above described or the polymer synthesized according to the process as above described.

The polymer and the polymer composition comprised in the article according to the present invention have the same characteristics respectively as the copolymer and the polymer composition according to the present invention, in all their embodiments, as above detailed.

The article is advantageously an article used in medical, plumbing or aerospace applications. Non limitative examples thereof are listed below. Among them, the article according to the present invention may notably be a pipe, a fitting, a manifold, a valve, a medical instrument or part of instrument, a medical case or tray, an aircraft interior panel or component, a cookware, a laboratory animal cage, a laboratory equipment, a coating and a composite.

The outstanding properties, and in particular their chemical resistance, featured by the copolymer and the polymer composition as above described allow a lower risk of failure by exposure of the articles according to the present invention to chemicals found in their environment. Such chemicals commonly found include solvent cements for PVC and CPVC (methyl ethyl ketone (MEK), tetrahydrofurane (THF) and cyclohexanone), solvent based paints and caulks, PU sealing foams, various adhesives, cleaning agents containing surfactant chemicals and anti pest formulations containing solvent carriers, chemical cleaners, enzyme cleaners, hydraulic fluids, fuels.

Non limitative examples of articles according to the present invention are:

Plumbing—Fittings and Manifolds

Articles according to the present invention may be plumbing systems including a series of pipes, fittings, manifolds and valves that are used for the transportation of water or other fluids under pressure. Common applications thereof include domestic hot and cold water, radiator heating systems, floor and wall heating and cooling systems, compressed air systems and piping systems for natural gas. Such fittings may be insert fittings used in conjunction with PEX (cross linked polyethylene), PEX/Al/PEX, PE (polyethylene)/Al/PE, PB (polybutylene) and other flexible piping solution where the pipe is secured to the fitting by some type of mechanical deformation of a metal ring or sleeve on the outside diameter surface of the pipe which causes the plastic flow of the pipe around features of the fitting produced from the polymer. Said ring used to compress the pipe may also comprise the copolymer or the polymer composition as above described. Such fittings may be also be pipe fittings where a pipe of any material (plastic, steel, copper) is inserted into the fitting and a seal is formed on the outside diameter or inside diameter of the pipe by means of an elastomeric material and the pipe is retained in the fittings by other mechanical means. Manifolds used for example for the distribution of water that incorporate any of the above means of connecting the pipe to make a plumbing system as well as valves used in plumbing systems to stop the flow at any fixtures or appliance which are connected to the pipe as part of a plumbing system are also part of the present invention.

Plumbing—Faucets and Valves

Other articles include water ways for faucet applications and valve bodies for showers, which are subjected to long term hydrostatic stress, in the areas of bathroom, kitchen or laundry where cleaning chemicals containing surfactants or other aggressive stress cracking agents may be present and or the chemicals used during installation could come in contact with the part and cause premature failure through environmental stress cracking.

Medical/Dental/Healthcare

In the medical field, articles according to the present invention include medical instruments or parts of instruments (handles, viewing glasses), components of medical equipments that handle or dispense chemicals used in medical procedures (such as anesthesia), cases and trays used to hold such instruments all requiring cleaning and sterilization using steam, radiation, enzyme cleaners and/or chemical cleaners.

Aircraft Interiors

Other articles according to the present invention include also interior panels and components (ducts, wire coatings, etc) on aircraft which require low flame and smoke generation during ignition and are subject to chemical stress cracking by the intentional or accidental exposure to cleaning chemical, hydraulic fluids, fuels or other chemicals that are found in the environment.

Food Service

Other articles include plastic components used in commercial food service application such as warming trays, steam table trays, plastic cook ware commercial dispense equipment where stress cracking has been seen in components produced from other high Tg amorphous polymers due to the nature of the food stuff when exposed to high temperature (various oils and greases) or the cleaning chemicals used in cleaning the components.

Dairy Equipment

Other articles according to the present invention include also component of piping systems used for the collection or transportation of milk and other dairy products where such components are subject to aggressive chemical cleaners and/or other chemicals used in the milk collection environment such as bug sprays.

Laboratory Animal Cages

Other articles include cages used for housing of mice and rats for the purpose of medical studies where the cages are subject to aggressive cleaning environments similar to those used for medical components.

Laboratory Equipment

Other articles include also funnels, filter device and other lab equipment that may require aggressive chemical application.

Coating and Composites

Other articles according to the present invention include also coating and composites with improved resistance to aggressive chemicals, applied in powder form or emulsions as mono component or multicompent coatings for non stick cook wear, corrosion resistant coatings and non-stick coatings for other applications such as powder handling.

Filtration Devices

Other articles according to the present invention include also fibers, fabrics, filters, filter assemblies, filtration devices and bag houses especially well suited for industrial filtration applications where the materials are subject to aggressive chemical environments.

Should the disclosure of any of the patents, patent applications, and publications that are incorporated herein by reference conflict with the present specification to the extent that it might render a term unclear, the present specification shall take precedence.

EXAMPLES

Preparation of Copolymers According to the Invention (Polyphenyl Sulfone ketone or PPSK)

Procedure to make PPSK (75/25) using 4,4'-difluorobenzophenone (DCDPS/DFBP)

To a one liter resin kettle equipped with an overhead agitator, nitrogen inlet, reflux condenser with a dean stark trap, was charged 76.3 g 4,4'-biphenol, 89.2 g of dichlorodiphenylsulfone, 22.6 g of 4,4'-difluorobenzophenone, 58.3 g of anhydrous potassium carbonate, and 375 g of diphenyl sulfone. The reaction mixture was evacuated and backfilled with dry nitrogen three times. The temperature was raised to 275° C. over 2-2.5 hours. The reaction was allowed to proceed with stirring and under a positive flow of nitrogen until the desired molecular weight was achieved. Water was collected in the dean stark trap during the polymerization. Dichlorodiphenylsulfone, 2.5 g, was then added and the reaction was allowed to proceed for another hour. The hot reaction mixture was poured into a stainless steel pan and allowed to cool down and solidify. The reaction mixture was ground in a grinder to a free flowing powder. The powder was then subjected to six acetone washes for 1 hour each followed by six acidified water washes. Finally, the powder was washed two times with de-ionized water followed by a methanol wash, and dried in a vacuum oven.

Procedure to Make PPSK (65/35) Using 4,4'-Difluorobenzophenone (DCDPS/DFBP)

Similar process than the one described above was used to make a 65/35 PPSK by adjusting the charges appropriately.

Procedure to Make PPSK (75/25) using 4,4'-dichlorobenzophenone (DCDPS/DCBP)

To a one liter resin kettle equipped with an overhead agitator, nitrogen inlet, reflux condenser with a dean stark trap, was charged 74.5 g 4,4'-biphenol, 87.0 g of dichlorodiphenylsulfone, 25.4 g of 4,4'-dichlorobenzophenone, 60.1 g of anhydrous potassium carbonate, and 365 g of diphenyl sulfone. The reaction mixture was evacuated and backfilled with dry nitrogen three times. The temperature was raised to 275° C. over 2-2.5 hours. The reaction was allowed to proceed with stirring and under a positive flow of nitrogen until the desired molecular weight was achieved. Water was collected in the dean stark trap during the polymerization. Dichlorodiphenylsulfone, 2.5 g, was then added and the reaction was allowed to proceed for another hour. The hot reaction mixture was poured into a stainless steel pan and allowed to cool down and solidify. The reaction mixture was ground in a grinder to a free flowing powder. The powder was then subjected to six acetone washes for 1 hour each followed by six acidified water washes. Finally, the powder was washed two times with de-ionized water followed by a methanol wash, and dried in a vacuum oven.

Procedure to Make PPSK (65/35) using 4,4'-dichlorobenzophenone (DCDPS/DCBP)

Similar process than the one described above was used to make a 65/35 PPSK by adjusting the charges appropriately.

Procedure to Make PPSK (75/25) using 4,4'-dihydroxybenzophenone (Biphenol/DHBP)

To a one liter resin kettle equipped with an overhead agitator, nitrogen inlet, reflux condenser with a dean stark trap, was charged 55.9 g 4,4'-biphenol, 116.0 g of dichlorodiphenylsulfone, 21.4 g of 4,4'-dihydroxybenzophenone, 60.8 g of anhydrous potassium carbonate, and 373 g of diphenyl sulfone. The reaction mixture was evacuated and backfilled with dry nitrogen three times. The temperature was raised to 275° C. over 2-2.5 hours. The reaction was allowed to proceed with stirring and under a positive flow of nitrogen until the desired molecular weight was achieved. Water was collected in the dean stark trap during the polymerization. Dichlorodiphenylsulfone, 2.41 was then added and the reaction was allowed to proceed for another hour. The hot reaction mixture was poured into a stainless steel pan and allowed to cool down and solidify. The reaction mixture was ground in a grinder to a free flowing powder. The powder was then subjected to six acetone washes for 1 hour each followed by six acidified water washes. Finally, the powder was washed two times with de-ionized water followed by a methanol wash, and dried in a vacuum oven.

Best Mode to Make PPSK (75/25) using 4,4'-difluorobenzophenone (Biphenol/DFBP)

To a one liter resin kettle equipped with an overhead agitator, nitrogen inlet, reflux condenser with a dean stark trap, was charged 111.7 g 4,4'-biphenol, 131.2 g of dichlorodiphenylsulfone, 33.2 g of 4,4'-difluorobenzophenone, 77.6 g of anhydrous potassium carbonate, 6.6 g anhydrous sodium carbonate and 436 g of diphenyl sulfone. The reaction mixture was evacuated and backfilled with dry nitrogen three times. The temperature was raised to 275° C. over 2-2.5 hours. The reaction was allowed to proceed with stirring and under a positive flow of nitrogen until the desired molecular weight was achieved. Water was collected in the dean stark trap during the polymerization. Dichlorodiphenylsulfone (25.7 g, was then added followed by 51 g of anhydrous LiCl and the reaction was allowed to proceed for another hour. The hot reaction mixture was poured into a stainless steel pan and allowed to cool down and solidify. The reaction mixture was ground in a grinder to a free flowing powder. The powder was then subjected to six acetone washes for 1 hour each followed by six water washes including an acidified water wash. Finally, the powder was washed two times with acetone, and dried in a vacuum oven.

Procedure to Make PPSK (45/55) using 4,4'-difluorobenzophenone (DCDPS/DFBP)

To a 1-Liter Resin Kettle Quipped with an Overhead Agitator, Nitrogen Dip-Tube, thermocouple and a dean-stark trap with a condenser was charged 93.1 g of 4,4'-biphenol, 65.3 g of dichlorodiphenylsulfone, 60.6 g of 4,4'-difluorobenzophenone, 71.2 g of potassium carbonate and 444.1 g of diphenyl sulfone. The reaction mixture was evacuated and backfilled with dry nitrogen three times. The reaction mixture was slowly heated to 100° C. and the stirring was commenced. The temperature was raised to 275° C. and the reaction was allowed to proceed with stirring and under a positive flow of nitrogen until the desired molecular weight was achieved. Water was collected in the dean stark trap during the polymerization. Once the target endpoint was reached, 43 g of dichlorodiphenylsulfone was added to the reactor followed by 50 g anhydrous LiCl. The reaction mixture was held at temperature for 30 minutes, followed by pouring the contents in a stainless steel pan as thin sheets. The sheets were ground in a Wiley mill to free flowing powder. The powder was extracted with acetone six times and with water six times including one acidified water wash. The polymer was dried in a vacuum oven at 120° C. overnight.

Procedure to Make PPSK (55/45) using 4,4'-difluorobenzophenone (DCDPS/DFBP)

Similar process than the one described above was used to make a 55/45 PPSK by adjusting the charges appropriately.

Procedure to Make PPSK (45/55) and PPSK (55/45) using 4,4'-dichlorobenzophenone

Also, a similar process was used using 4,4'-dichlorobenzophenone instead of 4,4'-difluorobenzophenone.

Process to Make PPSK Segmented Block Copolymers (55/45 Composition)

To a 1-liter resin kettle quipped with an overhead agitator, nitrogen dip-tube, thermocouple and a dean-stark trap with a condenser was charged 95.7 g of dichlorodiphenylsulfone, 59.1 g of biphenol, 45.2 g of potassium carbonate, and 296.6 g of diphenylsulfone. The reaction set-up was evacuated and back filled with dry nitrogen three times. The reaction was slowly and the stirring was commenced. The temperature was raised to 275-320° C. and the polymerization was allowed to proceed for 2 hours. After two hours, 59.5 g of difluorobenzophenone, 52.6 g of biphenol, 40.2 g of potassium carbonate and 240.25 g of diphenylsulfone was added to the reactor slowly and the polymerization was allowed to proceed. Once the desired molecular weight was reached, 43.5 g of dichlorodiphenylsulfone was added followed by 54 g of LiCl. The reaction mixture was held at temperature for 30 minutes followed by pouring the contents in a stainless steel pan as thin sheets. The sheets were ground in a Wiley mill to free flowing powder. The powder was extracted with acetone six times and with water six times including one acidified water wash. The polymer was dried in a vacuum oven at 120° C. overnight.

Process to Make PPSK Segmented Block Copolymers (75/25 and 65/35 Compositions)

Similar process than the one described above was used to make 75/25 and 65/35 PPSKs by adjusting the charges appropriately.

Process to Make PPSK Segmented Block Copolymers (75/25 and 65/35 compositions) using 4,4'-dichlorobenzophenone Also, a similar process was used using 4,4'-dichlorobenzophenone instead of 4,4'-difluorobenzophenone to obtain segmented block copolymers.

Preparation of Three PPSU-PEEK Blends

We prepared three PPSU-PEEK (RADEL R®-5100 NT,-KETASPIRE® 880, both commercialized by SOLVAY ADVANCED POLYMERS, L.L.C.) blends containing 10, 20, and 25% PEEK on a twin screw extruder. From these blends, injection molded bars were prepared for ESCR testing using the method discussed below.

Physical Properties

The prepared polymers and blends were tested. Their tensile strength, their tensile elongation and their tensile modulus (all measured according to ASTM D638-03 or 08), their notched Izod impact strength (measured according to ASTM D256-06ae1), their Tg and Tm (measured by DSC) were compared to those or commercially available Radel R® PPSU.

The results of Table 1 show outstanding physical properties of PPSK in accordance with the invention (3 PPSK examples), in particular in terms of tensile and impact strength properties. They exhibit overall properties comparable to those of neat Radel® PPSU, while featuring unexpectedly improved properties when compared to those of Radel R®/PEEK (75/25) blend. In particular, the notched Izod impact strength property of the PPSK (75/25 composition) is far better than the corresponding properties of the blend (blend=2.13 ft-lbs/in vs. PPSK=11.5 ft-lb/in). Another benefit of the polymer according to the invention is purely aesthetical: PPSK copolymers are translucent, compared to the opaque blends (no phase separation).

Besides, PPSK polymers exhibit also a better melt flow at a given MFR as compared to Radel R® PPSU (improvement of about 20%). This can be significant if one were to design a complex geometry mold, due to better melt flow characteristics of PPSK. Thin walled parts can be fabricated easier as compared to neat Radel R®.

Results

When methylethylketone and cyclohexanone are used, RADEL® R PPSU exhibits no resistance for these two solvents. After exposure to methylethylketone for 30 s, PPSU immediately crazed and cracked into several pieces. PPSK samples exhibit greater resistance to these solvents as well as better resistance (as compared to RADEL® R PPSU) when ethylene glycol monoethyl ether and monoethyl ether of diethylene glycol are used.

After exposure to tetrahydrofuran for 30 s, the entire RADEL® R PPSU specimen exhibited crazings, whereas the PPSK samples only showed crazing above about 4000 psi.

Additional samples were immersed in 2-ethoxyethanol for 30 minutes. After 20 min, the entire RADEL® R PPSU specimen showed crazings whereas the PPSK samples showed crazings only above about 4000 psi.

The surfaces of the three RADEL® R PPSU-PEEK blends samples were exposed to methylethylketone for 30 s. They cracked under these conditions. Additional samples were exposed (surface) to tetrahydrofuran for 30 s. They showed crazing in the entire sample meaning that the critical stress was less than 1000 psi. Additional samples were immersed in 2-ethoxyethanol for 5 minutes. The blends all showed crazing above about 3000 psi. The chemical resistance of the blends was comparable to neat Radel® R.

Figure 1:
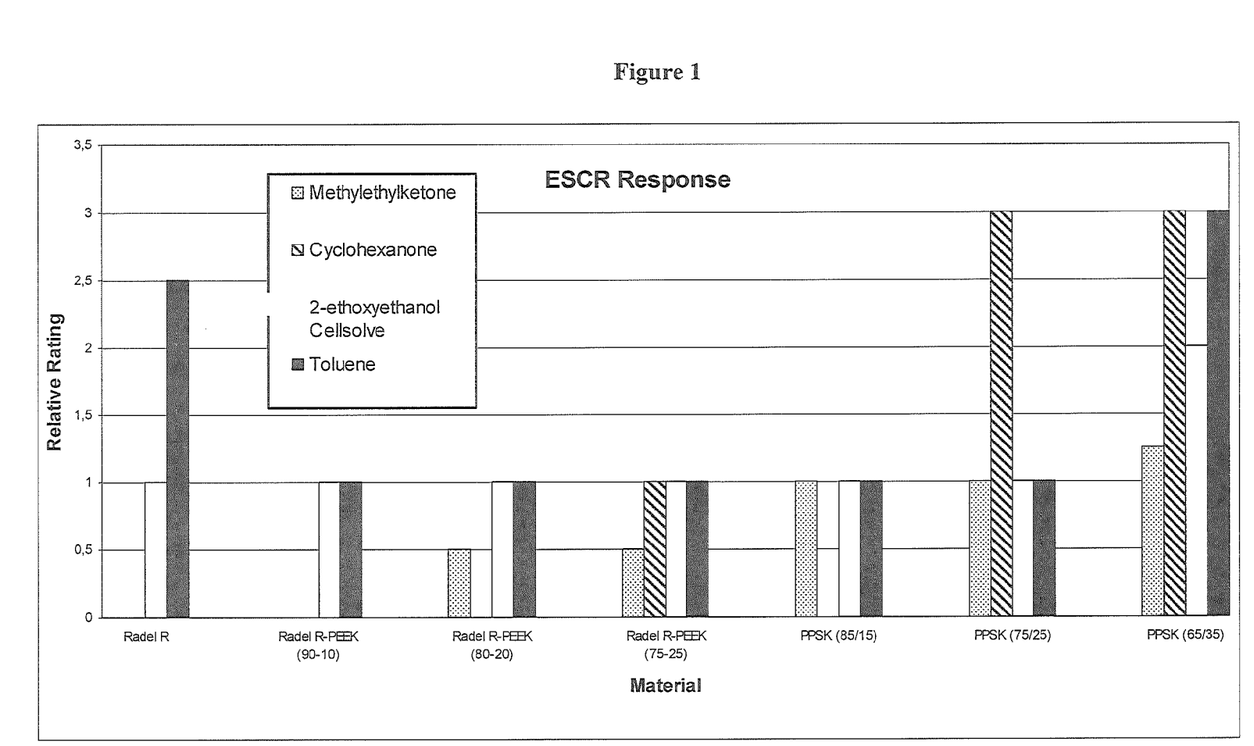
FIG. 1 is a graph of the ESCR response of different polymers according to the present invention versus other polymer and blends tested, presented in terms of relative ranking.

FIG. 1 is a graph of the ESCR response of the different polymers and blends tested in various chemical environment, namely in methylethylketone, cyclohexanone, 2-ethoxyethanol and in toluene, presented in terms of relative ranking. A higher ranking corresponds to a superior response. While a relative ranking of 1 corresponds to the observation of a high number of crazings propagating rapidly across the sample, a ranking of 2 corresponds to the presence of crazing, and a ranking of 3 corresponds to the presence of a lower number of crazings, and also to smaller crazings (that did not propagate across the sample, typically present on the edges of the samples).

TABLE 1

Polymer physical properties

| Properties | Units | Test Method | Radel R® | PPSK (75/25)[1] | PPSK (85/15)[1] | PPSK (65/35)[1] | Radel R®/PEEK blend (75/25) |
|---|---|---|---|---|---|---|---|
| Tensile Strength | psi | D638-03 | 11,000 | 10,600 | 10,400 | 10,200 | 9,200 |
| Tensile Elongation | % | D638-03 | 7.6 | 7.5 | 8.1 | 7.7 | 7.3 |
| Tensile Modulus | ksi | D638-03 | 346 | 333 | 332 | 329 | 354 |
| Notched Izod Impact Strength | ft-lb/in | D256-06ae1 | 11.7 | 11.5 | 12.0 | 13.1 | 2.13 |
| Glass transition Temperature | °C. | DSC | 220 | 210 | 215 | 205 | 156,215 |
| Tm | °C. | DSC | / | 352 | 319 | 353 | 339 |

[1]PPSK (75/25, 85/15, and 65/35) tensile properties were measured using ASTM D638-08.

ESCR Test

The environmental stress cracking resistance (ESCR) of samples was tested according to ISO 22088. Radel R® PPSU was tested as a control. Samples were attached to a parabolic test bar that applies a variable strain on the test specimen as a function of the instantaneous radius of curvature of the test bar. The corresponding stress for a material such as PPSU with a modulus of 340 ksi ranges from about 1000 psi (at the end of the bar with the smallest curvature) to about 5000 psi (at the end of the bar with the greatest curvature). The surfaces of the samples were exposed to different reagents.

Figure 2:
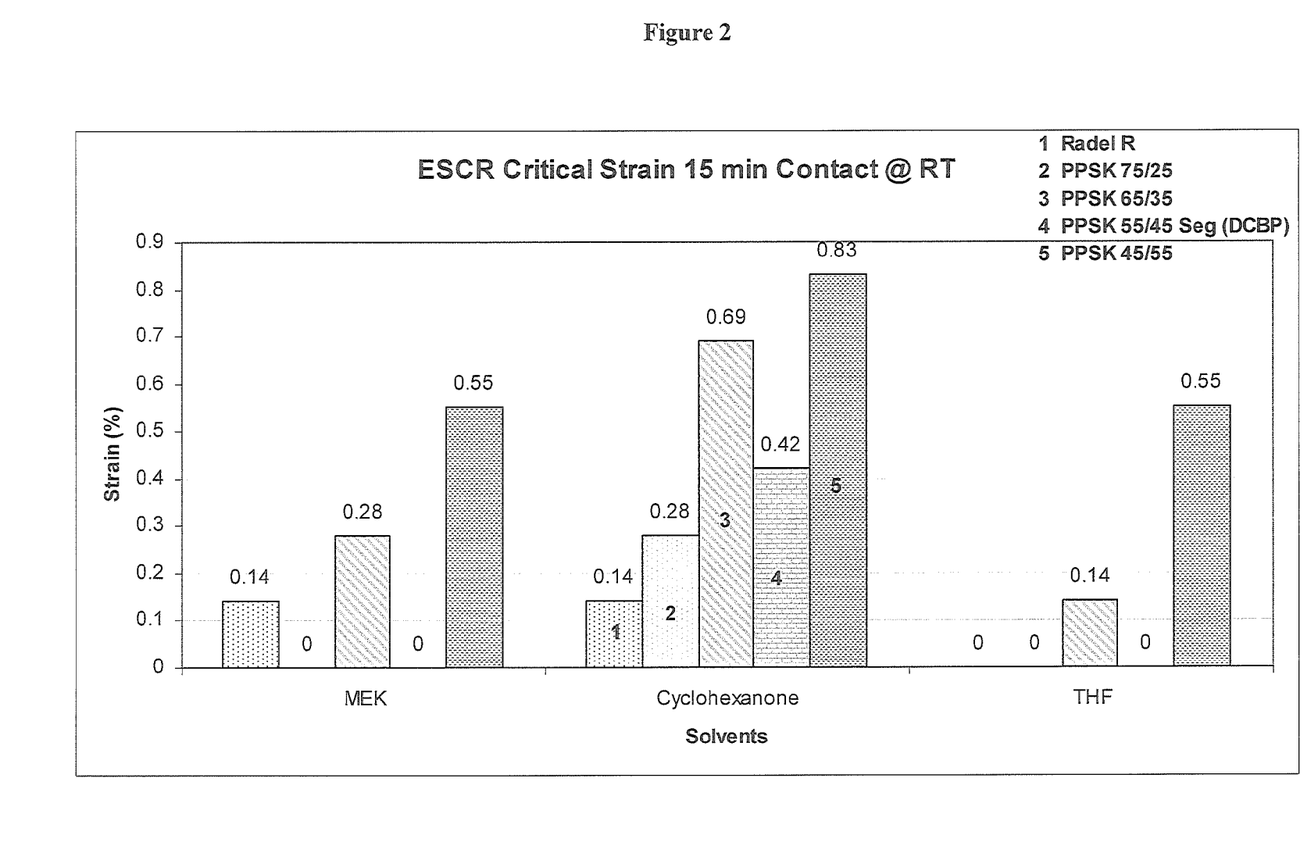
FIG. 2 is a graph of the ESCR critical strain at room temperature of various PPSK polymers compared to that of Radel R® PPSU polymer according to the present invention after a 15-minute exposure to three different solvents (methyl ethyl ketone, cyclohexanone, tetrahydrofurane).
Figure 3:
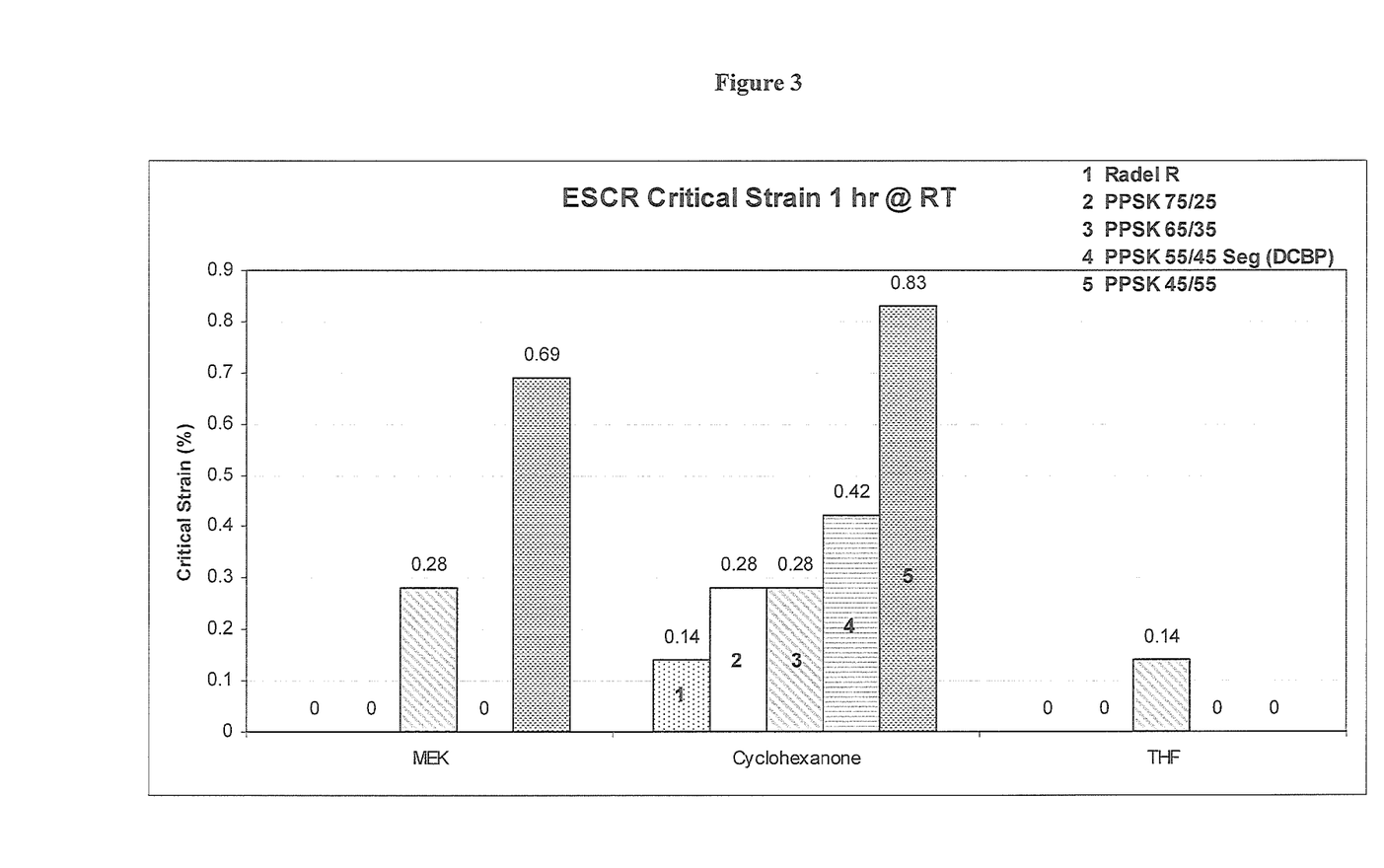
FIG. 3 is a graph of the ESCR critical strain at room temperature similar to FIG. 2 for the same polymers except that the exposure to each solvent is for 1 hour.
Figure 4:
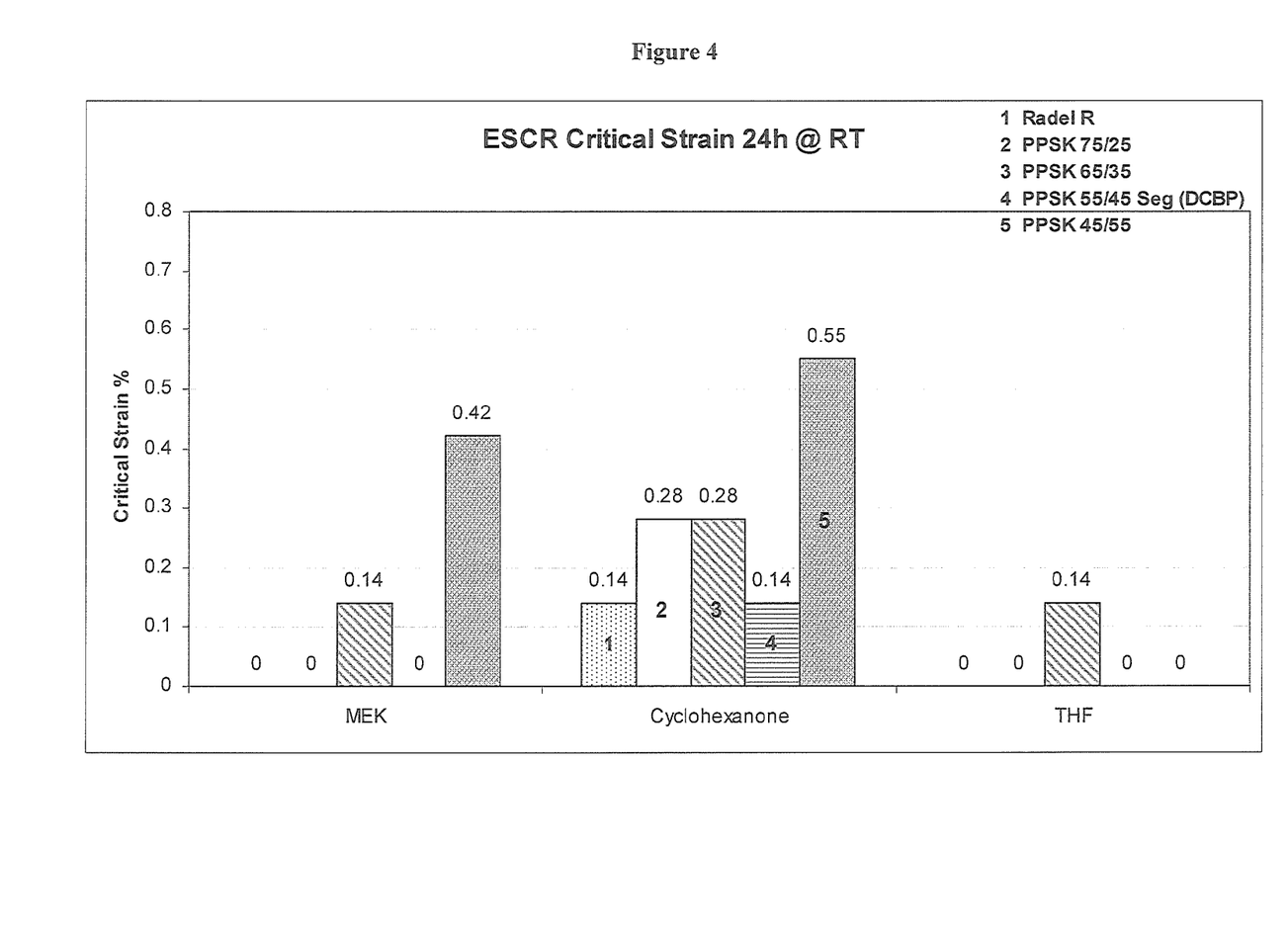
FIG. 4 is a graph of the ESCR critical strain at room temperature similar to FIG. 2 for the same polymers except that the exposure to each solvent is for 24 hour.

Further experiments were also made with the ESCR testing of various PPSK samples exposed to MEK, Cyclohexanone, and THF. Results are presented in FIGS. 2, 3 and 4. The numbers on the Y-axis represent the ESCR critical strain at room temperature where no crazes were observed. That is to say, that at these critical strains, the bars completely resisted the solvents (no visible crazes observed) for varying periods of time (15 min, 1 hour, and 24 hour exposure).

The invention claimed is:
1. A random co-polymer comprising groups:
(G1) of the formula (G2) of the formula (G3) of the formula wherein the ratio of the number of moles of (G1) over the number of moles of (G2) in said polymer is greater than 1,
said polymer further comprising recurring units (R1) obtained by the reaction between at least one aromatic dihalo compound (D1-1) comprising at least one group (G1) and at least one aromatic dihydroxy compound, and recurring units (R3) obtained by the reaction between at least one aromatic dihalo compound (D2-1) comprising at least one group (G2) and at least one aromatic dihydroxy compound wherein the at least one aromatic dihydroxy compound comprises at least one group selected from (G1) and (G3).

2. The random co-polymer according to claim 1, wherein the aromatic dihalo compound (D1-1) is a 4,4'-dihalodiphenylsulfone or 4,4'-bis[(4-chlorophenyl)sulfonyl]-1,1'-biphenyl and wherein the aromatic dihydroxy compound is 4,4'-biphenol.

3. The random co-polymer according to claim 1, further comprising recurring units (R2) obtained by the reaction between at least one aromatic dihydroxy compound (D1-2) comprising at least one group (G1), and at least one aromatic dihalo compound.

4. The random co-polymer according to claim 1, wherein the aromatic dihalo compound (D2-1) is a 4,4'-dihalobenzophenone and wherein the aromatic dihydroxy compound is 4,4'-biphenol.

5. The random co-polymer according to claim 1, further comprising recurring units (R4) obtained by the reaction between at least one aromatic dihydroxy compound (D2-2), comprising at least one group (G2) and at least one aromatic dihalo compound.

6. The random co-polymer according to claim 1, further comprising recurring units (R5) obtained by the reaction between at least one aromatic dihalo compound (D3-1), comprising at least one group (G3) and at least one aromatic dihydroxy compound.

7. The random co-polymer according to claim 1, further comprising recurring units (R6) obtained by the reaction between at least one aromatic dihydroxy compound (D3-2), comprising at least one group (G3) and at least one aromatic dihalo compound.

8. The random co-polymer according to claim 1, wherein the ratio of the number of moles of (G1) over the number of moles of (G2) is greater than 1.25 and lower than 15.

9. A composition comprising the random co-polymer according to claim 1.

10. A composition comprising the random co-polymer according to claim 8.

11. The composition of claim 9, further comprising at least one ingredient selected from the group consisting of a polymer, a solvent, a filler, and an additive.

12. A process for synthesizing the polymer according to claim 1, comprising:
adding at least one difunctional compound comprising a sulfone group, at least
one difunctional compound comprising a ketone group, at least one difunctional compound comprising an optionally substituted polyarylene group and at least one alkali metal carbonate and/or bicarbonate to a reaction medium, wherein the total number of mole of the difunctional compound comprising a sulfone group over the total number of mole of the difunctional compound comprising a ketone group ratio is greater than 1;
reacting together said difunctional compound comprising a sulfone group, said difunctional compound comprising a ketone group, and said difunctional compound comprising an optionally substituted polyarylene groups in order to obtain a polymer;
stopping said reaction as soon as the so-obtained polymer reaches the desired molecular weight; and
recovering the polymer having reached the desired molecular weight.

13. The process according to claim 12, wherein, if at least one of the difunctional compound is an aromatic difluoro compound, the process comprises an additional step of adding a salt (S) selected from the group consisting of lithium halide, calcium halide, magnesium halide, and mixtures thereof.

14. The process according to claim 13, wherein the salt (S) is selected from the group consisting of lithium chloride, calcium chloride, magnesium chloride, and mixtures thereof.

15. An article comprising the random co-polymer according to claim 1.

16. The article according to claim 15, being selected from the group consisting of a pipe, a fitting, a manifold, a valve, a medical instrument or part of instrument, a medical case or tray, an aircraft interior panel or component, a cookware, a laboratory animal cage, a laboratory equipment, a coating, a composite, a fiber, a fabric, a filter, a filter assembly, a filtration device, and a bag house.

17. An article comprising the composition according to claim 9.

18. The random co-polymer according to claim 2, wherein the aromatic dihalo compound (D2-1) is a 4,4'-dihalobenzophenone and wherein the aromatic dihydroxy compound is 4,4'-biphenol.

19. The random co-polymer according to claim 1, wherein said recurring units (R3) comprise at least one group (G2) and at least one of groups (G1) and (G3).

20. The random co-polymer according to claim 19, wherein said recurring units (R3) comprise at least one group (G2), and at least one group (G1).

21. The random co-polymer according to claim 1, which is prepared by a process comprising
adding at least one difunctional compound comprising a sulfone group, at least
one difunctional compound comprising a ketone group, at least one difunctional compound comprising an optionally substituted polyarylene group and at least one alkali metal carbonate and/or bicarbonate to a reaction medium, wherein the total number of mole of the difunctional compound comprising a sulfone group over the total number of mole of the difunctional compound comprising a ketone group ratio is greater than 1;

reacting together said difunctional compound comprising a sulfone group, said difunctional compound comprising a ketone group, and said difunctional compound comprising an optionally substituted polyarylene groups in order to obtain a polymer;

stopping said reaction as soon as the so-obtained polymer reaches the desired molecular weight; and recovering the polymer having reached the desired molecular weight.

* * * * *